(12) United States Patent
Uchida

(10) Patent No.: US 6,330,620 B1
(45) Date of Patent: Dec. 11, 2001

(54) ARRAYED I/O UNIT CLOSE DECISION METHOD AND APPARATUS, AND MEDIUM CONTAINING AN ARRAYED I/O UNIT CLOSE DECISION PROGRAM

(75) Inventor: Mitsujiro Uchida, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/217,066

(22) Filed: Dec. 21, 1998

(30) Foreign Application Priority Data

Dec. 26, 1997 (JP) .................................................. 09-360162

(51) Int. Cl.[7] ........................................................ H02H 3/05

(52) U.S. Cl. ...................................................... 710/1; 714/2

(58) Field of Search ................................ 710/1; 714/703, 714/704, 706, 707

(56) References Cited

U.S. PATENT DOCUMENTS

| | | | | |
|---|---|---|---|---|
| 5,513,185 | * | 4/1996 | Schmidt | 371/5 |
| 5,631,909 | * | 5/1997 | Weng et al. | 371/5 |
| 5,878,064 | * | 3/1999 | Goodwin, III | 371/68 |
| 6,006,016 | * | 10/1999 | Faigon et al. | 395/185 |
| 6,009,538 | * | 12/1999 | Goodwin, III et al. | 714/25 |

* cited by examiner

Primary Examiner—Bipin Shalwala
Assistant Examiner—Nitin Patel
(74) Attorney, Agent, or Firm—McGinn & Gibb, PLLC

(57) ABSTRACT

The present invention provides an arrayed I/O unit close decision method comprising: an initialization step for setting an initial value A in a counter; an upgrade step for adding a constant B to the counter upon a normal operation of an I/O unit in response to an access; a downgrade step for subtracting a constant C from the counter upon an operation failure of an I/O unit in response to an access which failure can be eliminated by a retrial; and a close step for closing an I/O unit whose counter value has become below a value E.

14 Claims, 6 Drawing Sheets

ARRAYED I/O UNIT CLOSE DECISION METHOD AND APPARATUS, AND MEDIUM CONTAINING AN ARRAYED I/O UNIT CLOSE DECISION PROGRAM

BACKGROUND OF THE INVENTION

1. Field of the Invention

The present invention relates to an arrayed I/O unit close decision method and apparatus and a medium containing an arrayed I/O unit close decision program and in particular, to an arrayed I/O unit close decision method and apparatus for controlling a timing to close out from a system an arrayed I/O unit which has frequently caused an operation failure, as well as a medium containing an arrayed I/O unit close decision program.

2. Description of the Related Art

Suppose as an arrayed I/O apparatus, a disc array system in which a plurality of disc units are arranged in an array. Each of the arrayed disc units has normally a retry circuit. When one of the arrayed I/O units is accessed and a data read-out or write-in fails, the retry circuit tries to repeat the read-out or write-in operation. If this retrial is successful, i.e., the read-out or the write-in operation is completed successfully by this retrial, the currently executed processing is continued as it is.

On the other hand, if the retrial is unsuccessful and a predetermined number of retrials is reached, it is decided that the operation failure cannot be eliminated by retrial and the arrayed disc unit accessed is closed out from the system.

Here, the retry circuit executing the retrial should execute various processes required for the retrial operation such as an initial error detection, an error latch release, a fall back operation for re-executing a transaction, a mechanical positioning, and the like. For this, the processing time required for retrial is usually 100 times more than a processing time required for a normal access operation.

However, in the aforementioned conventional example, even if the number of retrials is limited to once, the disc unit which has caused an access error will not be closed from the system if the access error is eliminated by one retrial. Accordingly, if that disc unit is frequently accessed, the retrial is repeated each time, increasing the average transaction processing time, disabling the practical use of the system.

Suppose one retrial requires a time equal to N times of a time Tn required for a normal operation. If an operation failure occurs with a probability P, an average transaction processing time Tv is calculated as follows.

$$Tv = (1-P) \times Tn + P \times N \times Tn \quad (1)$$
$$= Tn + (N-1) \times P \times Tn$$

Here, the second term in Expression (1) represents a transaction processing delay time caused by an operation failure. If the value of N becomes 100 times, the average transaction processing time is doubled even if the P is 1%. Suppose P is 50% which is a conventional limit value for close, then the average transaction processing time becomes 50 times more than a normal operation. That is, the aforementioned system cannot be used in practice.

SUMMARY OF THE INVENTION

It is therefore an object of the present invention to provide an arrayed I/O unit close decision method and apparatus capable of closing an I/O unit having an increased "ratio" of access failure so as to maintain a system performance decrease within an allowable range, enabling to assure a system reliability, as well as to provide a medium containing a close decision program.

The arrayed I/O unit close decision method according to the present invention (as claimed in claim 1) comprises: an initialization step for setting an initial value A in a counter; an upgrade step for adding a constant B to the counter upon a normal operation of an I/O unit in response to an access; a downgrade step for subtracting a constant C from the counter upon an operation failure on an I/O unit in response to an access which failure can be eliminated by a retrial; and a close step for closing an I/O unit whose counter value has become below a value E.

Here, an I/O unit includes a disc apparatus, a disc control apparatus, a semiconductor memory, and other various apparatuses for a data input/output as well as an output apparatus having no input function. Moreover, if $B \times C > 0$, these parameters may be negative or positive. It should be noted that "below the value E" may mean literally "smaller than the value E" if $(E-A)<0$, or "greater than the value E" if $(E-A)>0$. (This also applies to claims 3 and 5).

The arrayed I/O unit close decision method according to the present invention (as claimed in claim 2) may further comprise a limit step for resetting a counter to a threshold value if the counter exceeds the threshold value D.

Here, $B \times (A-D) \leq 0$ should be satisfied. It should be noted that "exceeds D" may mean literally "greater than D" if $(A-D) \leq 0$ or "smaller than D" if $(A-D) \geq 0$. (This also applies to claims 4 and 6.).

The arrayed I/O unit close decision apparatus according to the present invention (as claimed in claim 3) comprises: an initialization block for setting an initial value A in a counter; an upgrade block for adding a constant B to the counter upon a normal operation of an I/O unit in response to an access; a downgrade block for subtracting a constant C from the counter upon an operation failure of an I/O unit in response to an access which failure can be released by a retrial; and a close block for closing an I/O unit whose counter value has become below a value E.

The arrayed I/O unit close decision apparatus according to the present invention (as claimed in claim 4) may further comprise a limit block for resetting a counter value to a threshold value D when the counter value has exceeded the threshold value D.

The medium according to the present invention (as claimed in claim 5) contains an arrayed I/O unit close timing decision program to be executed by a computer, the program causing to: set an initial value A in a counter; add a constant B to the counter upon a normal operation of an I/O unit in response to an access; subtract a constant C from the counter upon an operation failure of an I/O unit in response to an access which failure can be eliminated by a retrial; and close an I/O unit whose counter value has become below a value E.

The arrayed I/O unit close timing decision program (as claimed in claim 6) may further cause to reset a counter value to a threshold value D when the counter value has exceeded the threshold value D.

In the aforementioned configurations claimed in claims 1, 3, or 5, if an I/O unit causes a number of retrials for its operation failure, the I/O unit is immediately closed. Even when the number of retrials is small for one operation failure, if the I/O unit which has caused the failure is accessed frequently, i.e., the operation failure occurs frequently, the I/O unit is promptly closed In the aforementioned configurations claimed in claims 2, 4, or 6, an I/O unit which has been operating normally is also immediately closed if it suddenly fails to operate normally, increasing the failure occurrence frequency.

Here, explanation will be given on the aforementioned parameters A, B, C, and D.

In an information processing system, firstly, it is necessary to estimate a transaction processing time Vn required during a normal operation, and a transaction processing time Vr required when an operation failure occurs. The Vn depends on the information processing system but practically can be handled as a constant, assuming a load state of information processing during a normal operation. Moreover, the Vr can also be handled as a constant, assuming the maximum retrial time which may be caused in the information processing system or a case of operation failure having the highest probability in the information processing system.

Next, assuming a case of an operation failure which has occurred with a high probability, it is necessary to set a largest average transaction time Va that can be allowed by the information processing system and a close allowing time Xa. For example, when the average transaction time Va is Ma times more than in a normal operation mode, the close allowing time is set to Xa. In this case, if the operation failure probability is Pa, the following relationships can be obtained.

$$Xa = Va \cdot (D/((1-Pa) \cdot B - Pa \cdot C)) \quad (2)$$

$$Ma = Va/Vn \quad (3)$$

$$Va = (1-Pa) \cdot Vn + Pa \cdot Vr \quad (4)$$

On the other hand, when the average transaction time Vb is Mb times more than in a normal operation mode, the close allowing time is set to Xb. In this case, if the operation failure probability is Pb, the following relationships can be obtained.

$$Xb = Vb \cdot (D/((1-Pb) \cdot B - Pb \cdot C)) \quad (5)$$

$$Mb = Vb/Vn \quad (6)$$

$$Vb = (1-Pb) \cdot Vn + Pb \cdot Vr \quad (7)$$

Moreover, from Equations (3), (4), (6), and (7), it is possible to obtain Equations as follows.

$$Pa = Vn \cdot (Mn-1)/(Vr-Vn) \quad (8)$$

$$Pb = Vn \cdot (Mb-1)/(Vr-Vn) \quad (9)$$

In the Equations (8) and (9), the right terms consist of constants and accordingly, the Pa and Pb are determined. By substituting the Pa and Pb into the Equations (4) and (7), the Va and Vb are determined. It is clear that the values B, C, and D depend on the two relationships expressed by Equations (2) and (5). The A, B, C, and D need to be set so as to satisfy these Equations.

Here, the initial value A, in general, can be set to a value equal to the threshold value D of the counter. On the other hand, in a case of an information processing system that carries out a test diagnosis operation during an initial period of time, it is sometimes preferable to set the I/O unit close condition more strictly than that of the stationary operation period. In this case, A can be set to any value if it satisfies A<D.

DESCRIPTION OF THE PREFERRED EMBODIMENTS

Description will now be directed to preferred embodiments of the present invention with reference to the attached drawings.

[Embodiment 1]

Explanation will be given on the first embodiment of the present invention with reference to FIG. 1 to FIG. 5.

Figure 1:
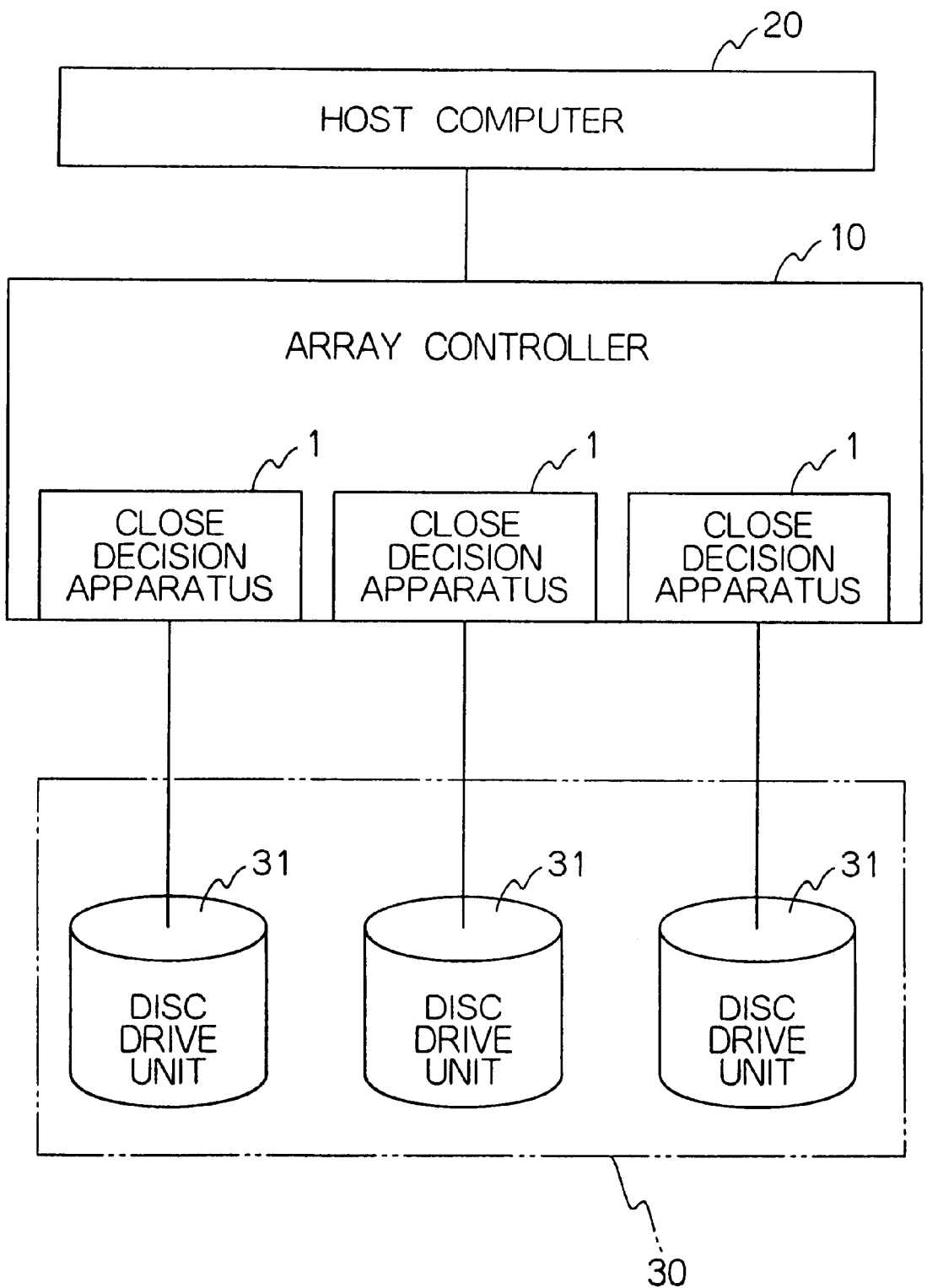
FIG. 1 is a block diagram showing a configuration of a system using a close decision apparatus according to a first embodiment of the present invention.

In FIG. 1, a host computer 20 is connected via an array controller 10 to an array disc 30 as an arrayed I/O apparatus. This arrayed disc 30 is constituted by three disc drive units 31 in this embodiment. These three disc drive units 31 incorporate to execute redundant storage of an external record data outputted from the host computer 20. In the array controller 10, each of the disc drive units 31 is provided with a close decision apparatus 1. These three close decision apparatuses 1 have an identical configuration.

Figure 2:
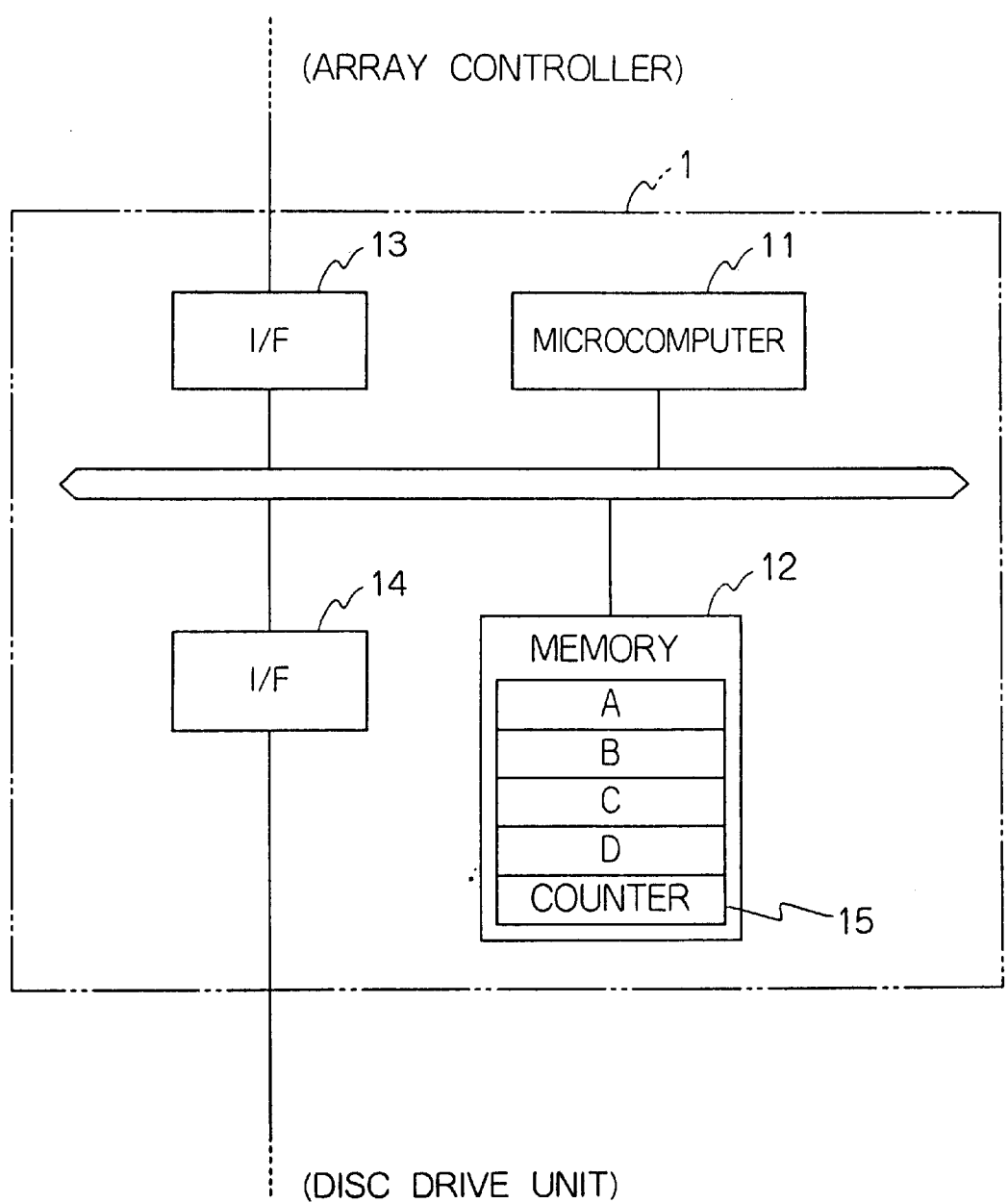
FIG. 2 is a block diagram showing an internal configuration of the close decision apparatus shown in FIG. 1.

FIG. 2 is a block diagram showing a configuration of the close decision apparatus of FIG. 1. A bus 1A is connected to a microcomputer 11 operated by execution of a micro-program; a memory 12 for storing constants A, B, C, and D, and a value of a counter 15; an interface (I/F) 13 for a data input/output to/from a main body of the array controller 10; and an interface 14 for a data input/output to/from the disc drive units 31.

Figure 3:
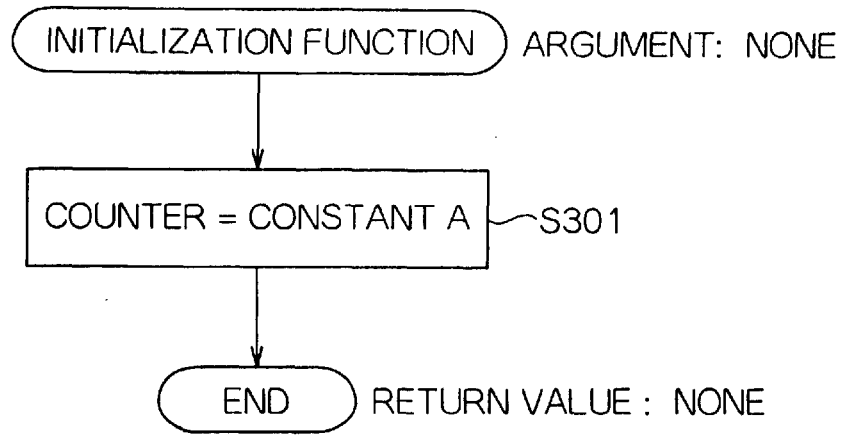
FIG. 3 is a flowchart of an initialization function executed by a microcomputer used in the close decision apparatus shown in FIG. 2.
Figure 4:
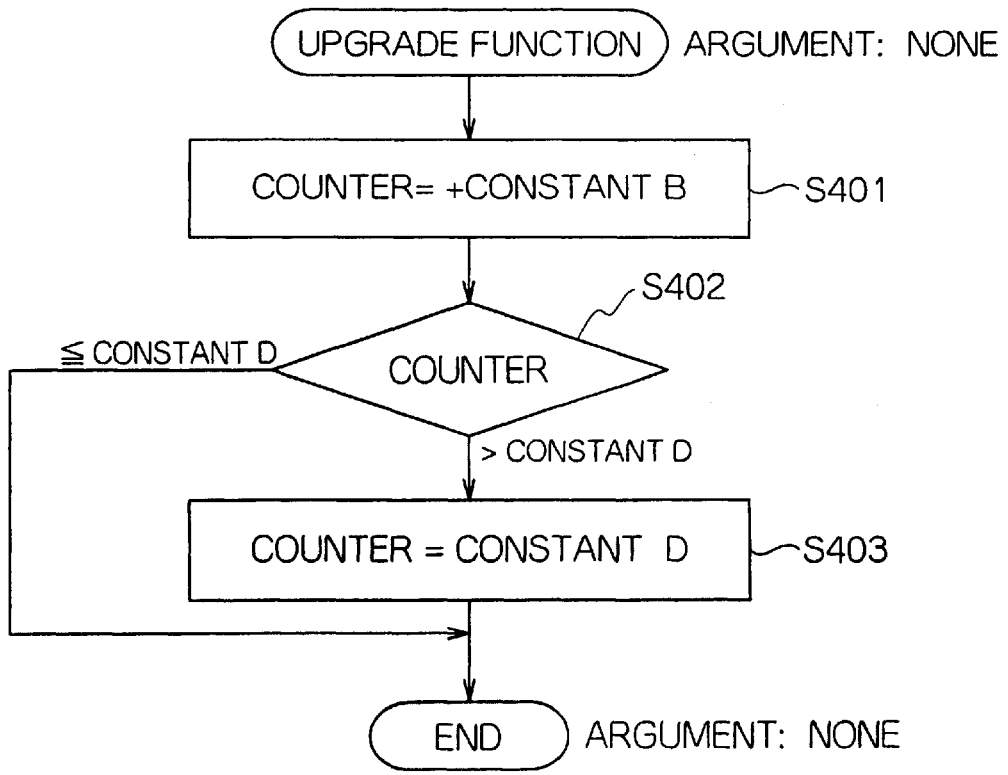
FIG. 4 is a flowchart of an upgrade function executed by the microcomputer shown in FIG. 2.
Figure 5:
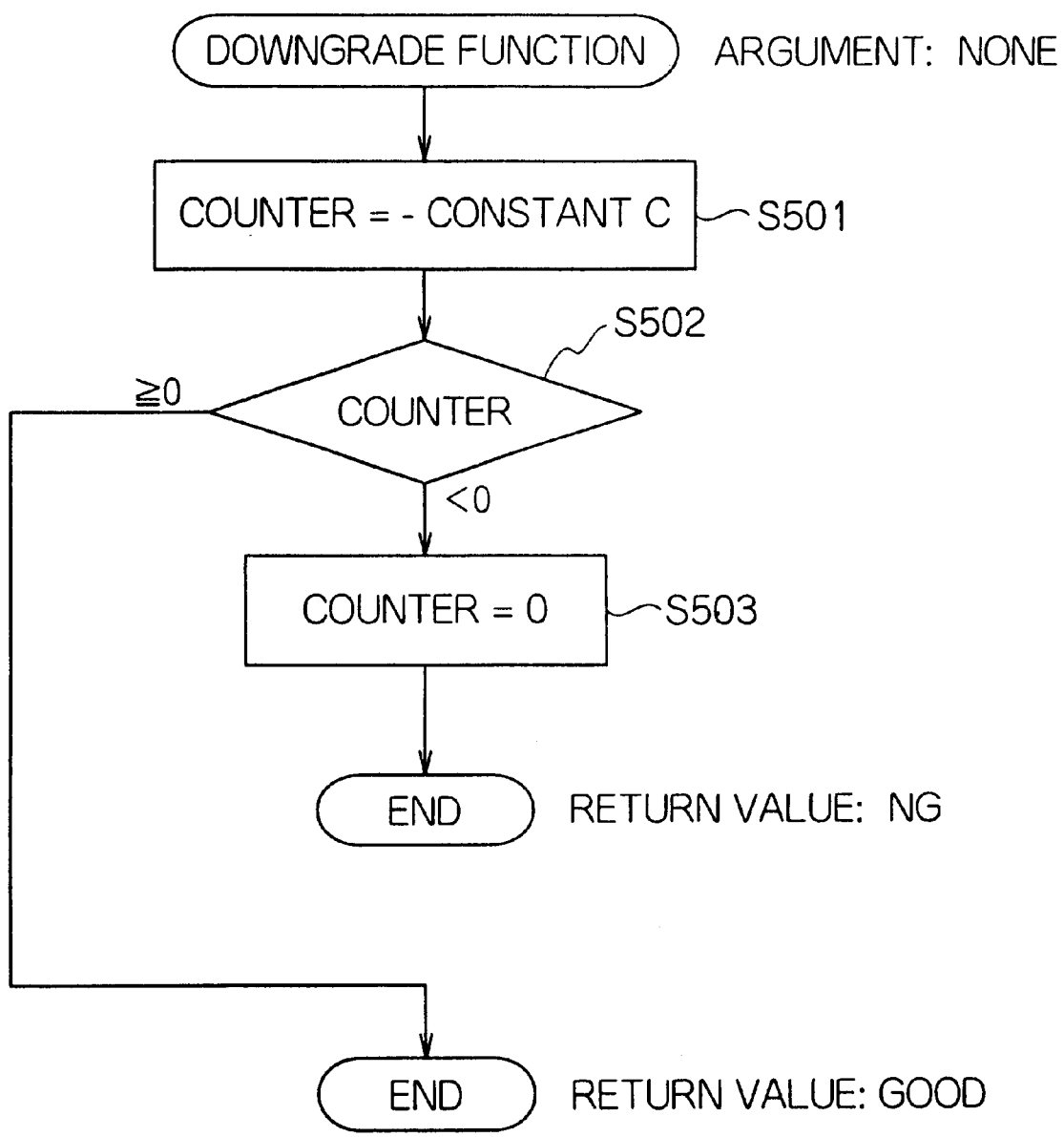
FIG. 5 is a flowchart of a downgrade function executed by the microcomputer shown in FIG. 2.

FIG. 3, FIG. 4, and FIG. 5 are flowcharts showing operations of functions carried out by execution of the micro-program by the microcomputer 11. This micro-program is constituted by an initialization function, an upgrade function, and a downgrade function.

FIG. 3 shows the initialization function that loads the constant A in the counter 15 (S301) and terminates.

FIG. 4 shows the upgrade function that adds the constant B to the counter 15 (S401) and compares the value of the counter 15 after the addition with the constant D (S402). If the value of the counter 15 is equal to or below the constant D, the operation terminates. On the contrary, if the value of the counter 15 exceeds the constant D, the constant D is loaded in the counter 15 (S403) and the operation terminates.

FIG. 5 shows the downgrade function that subtracts the constant C from the value of the counter 15 (S501) and decides whether the value of the counter 15 after the subtraction is positive or negative (S502). If the value of the counter 15 is equal to or above 0, "GOOD" is returned. On the contrary, if the value of the counter 15 is negative, 0 is loaded in the counter 15 (S503) and "NG" is returned, terminating the operation. Here, 0 is assumed to be the value E described in claims 1, 3, and 5.

According to this first embodiment, the array controller 10 carries out close management of the disc drive units 31 by starting the aforementioned functions provided for each of the close decision apparatus 1. The array controller 10, upon initialization of itself, starts the initialization function of the close decision apparatus 1 and initializes the counter 15. Next, the array controller 10 in an operation state starts the upgrade function and the downgrade function as follows. Each time the array controller 10 operates a disc drive unit 31, starts the upgrade function if the operation is successful and starts the downgrade function if an error is caused, requiring a retrial. Furthermore, the array controller 10 identifies the return value of the down grade function and continues the retrial processing if "GOOD" and terminates the retrial processing if "NG" which is followed by starting a close processing prepared in advance. The close processing is carried out to close the disc drive unit 31. When a disc drive unit 31 which has been closed is to be again incorporated in the array, the array controller 10 starts the initialization function to initialize the counter 15.

According to this embodiment, if an error requiring a retrial is repeatedly caused without being eliminated, the counter 15 reaches a negative value comparatively rapidly, closing from the system the disc drive unit 31 which has caused error. Moreover, even when an error occurs not locally, if the error occurrence ratio is increased, addition of the constant B to the counter 15 occurs less frequently than subtraction of the constant C from the counter 15. Accordingly, the counter 15 becomes negative and the disc drive unit which has caused the error is closed from the system. Thus, even if an error occurs intermittently, it is possible to maintain lowering of the system performance within an allowable range, allowing an automatic retrial upon an access failure within the range. This assures the system reliability. Moreover, the counter has the upper limit value D. Even when the disc drive units 31 operate normally without causing any error, the counter value will not exceed the value D. If an error occurs suddenly which cannot be released by several retrials, the disc drive unit 31 which has caused the error is closed from the system without any complicated procedure. This enables to maintain the aforementioned effect.

Here, in this embodiment, the microcomputer 11 contains a micro-program which is prepared in advance. The CPU in the microcomputer executes this program for carrying out the close decision processing of a disc drive unit. That is, this microcomputer 11 includes a recording medium containing a close decision program that can be read by the computer.

Moreover, instead of the microcomputer 11, it is possible to provide a CPU, and connect an external storage apparatus such as an FD drive and CDROM drive to the close decision apparatus 1, the array controller 10, or the host computer 20. A recording medium containing the close decision program and readable by a computer is mounted on the external storage apparatus, so that the close decision program stored in the recording medium is loaded in memory of the close decision apparatus so as to be executed by the CPU.

EXAMPLE

Next, explanation will be given on an example of the aforementioned first embodiment with modeled information processing system performance requirements and disc drive unit operation characteristics.

Suppose a disc drive operation failure occurs periodically with a probability P and the performance requirement of the information processing system is as follows: (1) The mode in which the I/O processing time is twice as much as the normal mode should be 30 seconds or below; and (2) the mod in which the I/O processing time is 1.3 times more than the normal mode should not continue more than 3 minutes. The operation time characteristic of a disc drive unit is modeled as follows: the normal I/O processing time is 10 ms; and the error detection time by the seek system and the medium system added by a time required for retrial is 1 second. It is assumed that the host computer issues an I/O signal at an interval 0. Using these condition values, it is possible to solve the aforementioned Equations (2) to (9). It should be noted that in practice, the constant A may be equal to the constant D (see Equation (10)), and the B may be 1.

$$\text{Constant } A = \text{Constant } D \quad (10)$$

$$\text{Constant } B = 1 \quad (11)$$

$$\text{Constant } C = 466 \quad (12)$$

$$\text{Constant } D = 5546 \quad (13)$$

Figure 6:
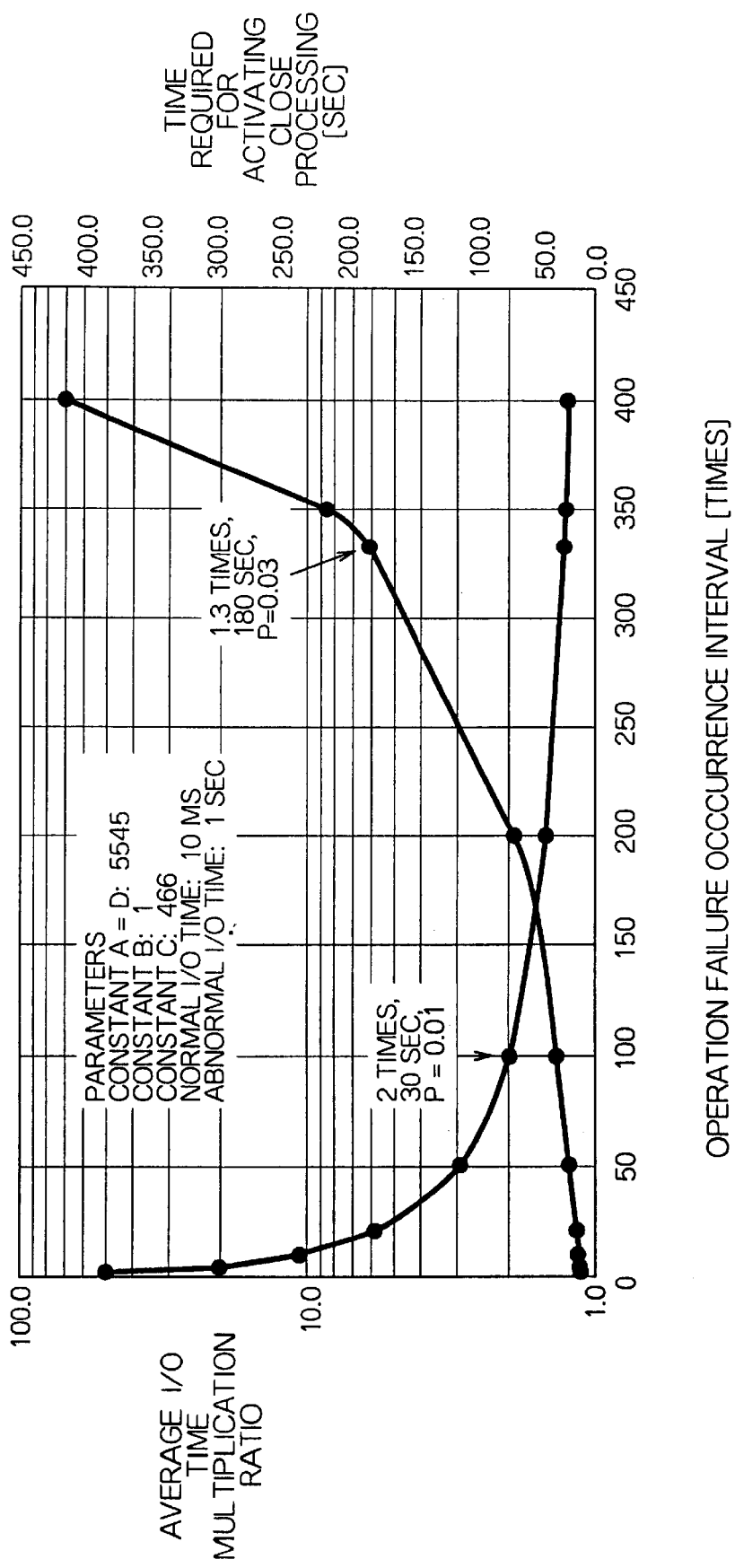
FIG. 6 shows evaluation of an example of the first embodiment.

FIG. 6 is a chart showing an operation characteristic of an information processing system using the aforementioned constants set as described above. From this FIG. 6, it can be seen that the close processing is activated in a comparatively short time to recover the operation performance in a region having a large average I/O time multiplication coefficient, greatly affecting the operation performance on the information processing system, whereas a comparatively long time is required to activate the close processing in a region having a small average I/O multiplication coefficient, little affecting the operation performance of the information processing system. From a viewpoint of using the information processing system, the aforementioned characteristic is convenient for handling the system.

[Embodiment 2]

Figure 7:
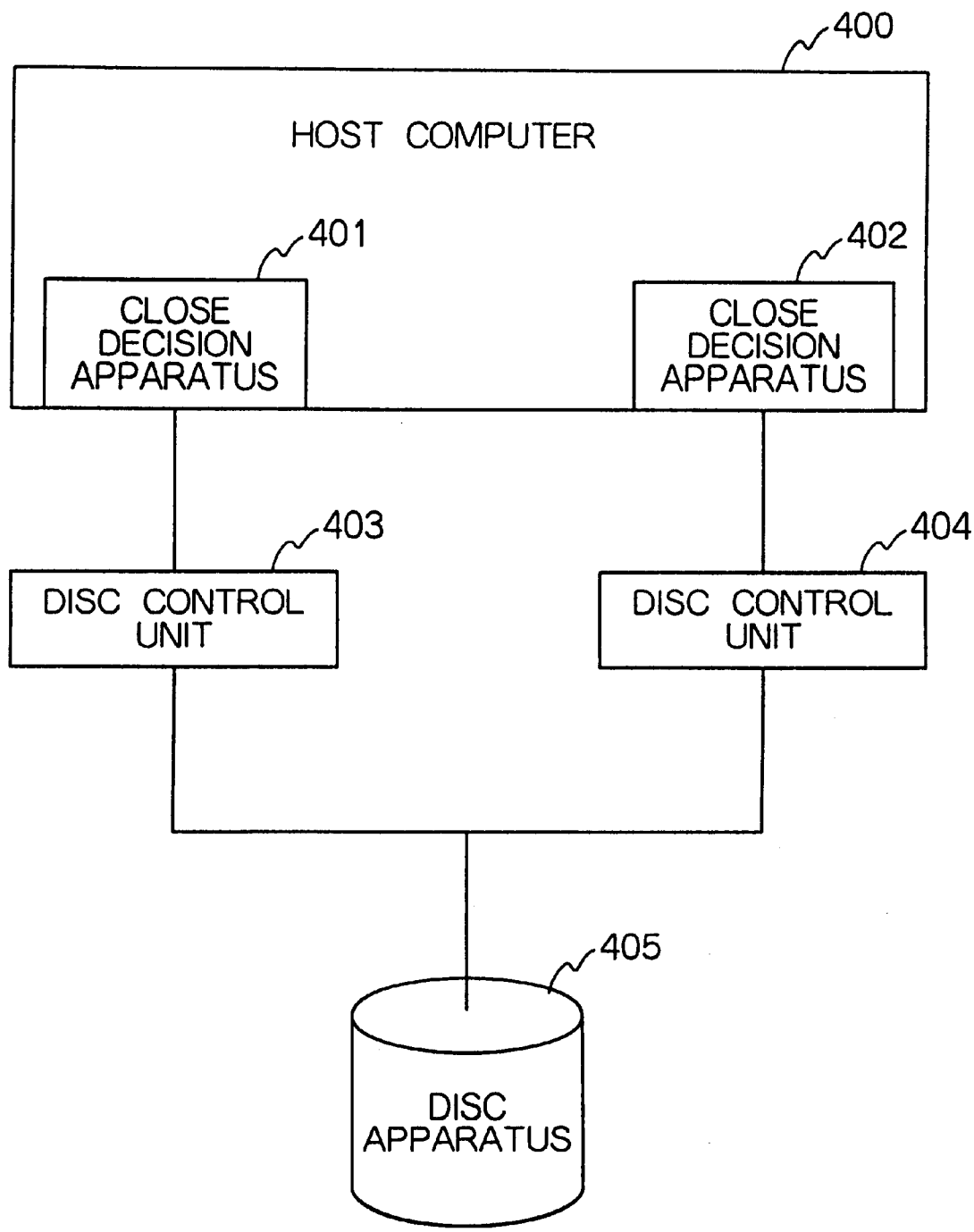
FIG. 7 is a block diagram showing a configuration of a system using a close decision apparatus according to a second embodiment of the present invention.

Description will now be directed to a second embodiment of the present invention with reference to FIG. 7.

In FIG. 7, a host computer 400 is connected via two disc control units 403 to a disc apparatus 405. The host computer 400 includes the close decision apparatuses 401 and 402 according to the present invention at connecting portions to the disc control units 403 and 404. Here, the close decision apparatus 401 and 402 have a configuration almost identical to that of the first embodiment except for that the interface (I/F) 13 of FIG. 2 is connected to the main body of the host computer and the interface (I/F) 14 is connected to the disc control units. The rest is identical to the aforementioned first embodiment and explanation will be omitted for that part. Moreover, in the second embodiment, the two disc control units 403 and 404 can be defined as arrayed I/O apparatuses.

In this second embodiment, the host computer carries out close management (also called path close management) of the arrayed disc control units 403 and 404.

The host computer 400, upon initialization of itself, activates the initialization function of the close decision apparatuses 401 and 402 and initializes the counter 15. Next, in an operation state, each time the host computer 400 operates the disc apparatus 405 via the disc control units 403 and 404, the host computer 400 activates an upgrade function if the operation is successful and a downgrade function if the operation has caused an error requiring a retrial in the disc control unit 403 or 404.

The host computer 400 checks a return value of the downgrade function and continues the retrial processing if the return value is "GOOD", or terminates the retrial processing if the return value is "NG", so as to activate a close processing (path close processing) prepared in advance. If the close processing (path close processing) is successful, the host computer 400 activates the initialization function to initialize the counter 15 so as to again incorporate the disc control unit 403 or 404. Thus, it is possible to obtain the same merits as in the first embodiment.

Here, in the aforementioned first and the second embodiments, if a normal operation is carried out in response to an access to an I/O unit, the counter value is increased, and if an operation failure is caused for the access, the counter value is decreased, so that when the counter value has become negative, the I/O unit is closed from the system.

However, the present invention is not limited to this configuration. It is also possible to decrease the counter value for a normal operation and increase the counter value for an operation failure (satisfying B×C >0). In this case the lower limit of the counter value is set as D and threshold value for deciding to close need be set to a value grater than the initial value A.

Moreover, in the aforementioned embodiments, the threshold value E for deciding to close need not be 0 but may be a predetermined value other than 0.

The present invention has the aforementioned configuration. In the invention claimed in claims 1, 3, and 5, a ratio of an access failure to an I/O unit is used to determine the closing of the I/O unit from the system. Accordingly, even for an intermittent access failure, it is possible to close the I/O unit from the system if the ratio of the access failure is increased. Consequently, it is possible to maintain the system performance lowering within an allowable range, where the access failure is followed by an automatic retrial, thus enabling to assure the system reliability.

Moreover, in the invention claimed in claims 2, 4, and 6, an upper limit (or a lower limit) D is set for the counter. Accordingly, the counter value will not exceed D even while the I/O unit is operating normally without causing any operation failure. Consequently, if an operation failure has occurred and cannot be eliminated by several times of automatic retrials, the I/O unit is promptly closed from the system, thus enabling to assure the system reliability.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 09-360162 (Filed on Dec. 26$^{th}$, 1997) including specification, claims, drawings and summary are incorporated herein by reference in its entirety.

What is claimed is:

1. An I/O unit close decision method comprising:

setting an initial value A in a counter;

adding a constant B to the counter upon a normal operation of an I/O unit in response to an access request;

subtracting a constant C from the counter whenever a retrial attempt is made for the I/O unit; and closing the I/O unit when the counter value falls below a value E, wherein said constants A, B, C, and E are preselected values based on a transaction processing time required during said normal operation and a transaction processing time required during said retrial attempt.

2. An I/O unit close decision method comprising:

setting an initial value A in a counter;

adding a constant B to the counter upon a normal operation of an I/O unit in response to an access request;

subtracting a constant C from the counter whenever a retrial attempt is made for the I/O unit;

closing the I/O unit when the counter value falls below a value E; and resetting the counter to a threshold value D if the counter exceeds the threshold value D.

3. An I/O unit close decision apparatus comprising:

an initializer for setting an initial value A in a counter;

an upgrader for adding a constant B to the counter upon a normal operation of an I/O unit in response to an access;

a downgrader for subtracting a constant C from the counter when a retrial attempt is made for the I/O unit; and a closer for closing the I/O unit when the counter value falls below a value E, wherein the I/O unit comprises one of a plurality of I/O units in an array and each I/O unit in the array has an associated counter.

4. An I/O unit close decision apparatus comprising:

an initializer for setting an initial value A in a counter;

an upgrader for adding a constant B to the counter upon a normal operation of an I/O unit in response to an access;

a downgrader for subtracting a constant C from the counter when a retrial attempt is made for the I/O unit;

a closer for closing the I/O unit when the counter value falls below a value E, wherein said constants A, B, C, and E are preselected values based on a transaction processing time required during said normal operation and a transaction processing time required during said retrial attempt.

5. An I/O unit close decision apparatus comprising:

an initializer for setting an initial value A in a counter;

an upgrader for adding a constant B to the counter upon a normal operation of an I/O unit in response to an access;

a downgrader for subtracting a constant C from the counter when a retrial attempt is made for the I/O unit;

a closer for closing the I/O unit when the counter value falls below a value E; and a limiter for resetting the counter value to a threshold value D when the counter value has exceeded the threshold value D.

6. An I/O unit close decision apparatus comprising:

an initializer for setting an initial value A in a counter;

an upgrader for adding a constant B to the counter upon a normal operation of an I/O unit in response to an access;

a downgrader for subtracting a constant C from the counter when a retrial attempt is made for the I/O unit; and a closer for closing the I/O unit when the counter value falls below a value E, wherein the I/O unit comprises one of a plurality of I/O units in an array and each I/O unit in the array has an associated counter.

7. A medium containing an I/O unit close decision program to be executed by a computer, said program causing the computer to:

set an initial value A in a counter;

add a constant B to the counter upon a normal operation of an I/O unit in response to an access request;

subtract a constant C from the counter upon making a retrial attempt for the I/O unit; and close the I/O unit when the counter value falls below a value E, wherein said constants A, B, C, and E are preselected values based on a transaction processing time required during said normal operation and a transaction processing time required during said retrial attempt.

8. A medium containing an I/O unit close decision program to be executed by a computer, said program causing the computer to:

set an initial value A in a counter;

add a constant B to the counter upon a normal operation of an I/O unit in response to an access request;

subtract a constant C from the counter upon making a retrial attempt for the I/O unit;

close the I/O unit when the counter value falls below a value E; and reset the counter value to a threshold value D when the counter value has exceeded the threshold value D.

9. A medium containing an I/O unit close decision program to be executed by a computer, said program causing the computer to:

set an initial value A in a counter;

add a constant B to the counter upon a normal operation of an I/O unit in response to an access request;

subtract a constant C from the counter upon making a retrial attempt for the I/O unit; and close the I/O unit when the counter value falls below a value E, wherein the I/O unit comprises one of a plurality of I/O units in an array and each I/O unit in the array has an associated counter.

10. An I/O unit close decision apparatus comprising:

an initializer for setting an initial value A in a counter;

an upgrader for changing in a first direction the value in said counter by a first constant B upon a normal operation of an I/O unit in response to an access, such that said first directional change is achieved by a first mathematical operation;

a downgrader for changing in a second direction opposite to said first direction the value in said counter by a second constant C when a retrial attempt is made for the I/O unit, such that said second directional change is achieved by a second mathematical operation which is complementary to said first mathematical operation; and a closer for closing the I/O unit when the counter value reaches a preselected value E, wherein said constants A, B, C, and E are preselected values based on a transaction processing time required during said normal operation and a transaction processing time required during said retrial attempt.

11. An I/O unit close decision apparatus of claim 10, wherein said first operation is addition and said second operation is subtraction.

12. An I/O unit close decision apparatus of claim 10, wherein said first operation is subtraction and said second operation is addition.

13. An I/O unit close decision apparatus of claim 10, wherein said first operation is multiplication and said second operation is division.

14. An I/O unit close decision apparatus of claim 10, wherein said first operation is division and said second operation is multiplication.

* * * * *